Jan. 28, 1969  G. J. LANSINK  3,424,896
ARRANGEMENT FOR ESTABLISHING WHETHER THE NUMBER OF PULSES
IN A RECURRENT SERIES IS A MULTIPLE OF N
Filed March 29, 1965  Sheet 1 of 3

INVENTOR.
GERRIT J. LANSINK
BY
AGENT

United States Patent Office 3,424,896
Patented Jan. 28, 1969

3,424,896
ARRANGEMENT FOR ESTABLISHING WHETHER THE NUMBER OF PULSES IN A RECURRENT SERIES IS A MULTIPLE OF N
Gerrit J. Lansink, Enschede, Netherlands, assignor to N.V. Hollandse Signaalapparaten, Hengelo, Overijsel, Netherlands, a firm
Filed Mar. 29, 1965, Ser. No. 443,601
Claims priority, application Netherlands, Mar. 27, 1964, 6403367
U.S. Cl. 235—92          6 Claims
Int. Cl. G06j 3/00

ABSTRACT OF THE DISCLOSURE

A device for determining whether the number of pulses in a recurring group of pulses is a multiple of N which uses an N stage counter to divide each pulse group. The content of the counter is examined after the termination of each group of pulses and compared with preceding counter read-outs; identical succeeding counter read-outs indicating that the number of pulses in the group is a multiple of N.

---

This invention relates to an arrangement for establishing whether the number of pulses in a recurrent series of pulses is a multiple of N.

In many cases electronic data handling systems need for their control series of pulses that are repeated again and again with a constant number of pulses which is a multiple of the number of pulses required for controlling a cycle of the data handling system. For this reason it is important to have an arrangement of the the type mentioned above, which can rapidly establish whether the number of pulses in a series of pulses actually is such a multiple. The invention provides an effective arrangement for this purpose wherein a cyclically operating counter with $n$ positions is driven step by step by the pulses of a series, while a circuit arrangement establishes the occurrence of an interval between two successive pulse series from the fact that the duration of a pulse interval exceeds a certain value. The circuit arrangement also provides means for establishing whether the counter returns to the same position after a pulse series interval established by the circuit arrangement. If the number of pulses in the pulse series is actually a multiple of N, the counter will reach the same position at any moment during each pulse series which is separated from a pulse series interval by a time interval of fixed duration. If, however, the number of pulses is not a multiple of N, then after that interval the counter will not reach the same position. By establishing whether the counter reaches the same position or not, it may, therefore, be established whether or not the number of pulses in a pulse series is a multiple of N.

A first embodiment of the invention makes use of a cathode ray oscilloscope. In this embodiment, changes in the electrical conditions occurring in the circuit arrangement as a result of the occurrence of a pulse series interval, and preferably of the end of a pulse series interval, start the time base circuit of a cathode ray oscilloscope for effecting one sweep while, the counter, in at least one of its positions, supplies a voltage that controls either the deflection of the cathode ray in the oscilloscope in a direction transverse to the time base motion, or a change in the intensity of the cathode ray. If the number of pulses in a series is a multiple of N, then the screen of the oscilloscope shows clearly separated displays of the moments at which the cathode ray is controlled by the counter. If this number is not a multiple of N, the images of these moments will intermix.

In another embodiment of the invention the counter supplies, in at least two positions that are mutually separated by a least one other position, a voltage differing from the quiescent value to an input circuit of a coincidence circuit allotted to the position in which the voltage is supplied. The coincidence circuit is controlled by the circuit arrangement to pass said voltage during the pulse series intervals established by said circuit arrangement to a control input circuit of an auxiliary trigger circuit allotted to the said position. The said trigger circuit is thereby switched over to a predetermined one of its two possible conditions, while a signal circuit is made operative by way of a coincidence circuit as soon as all auxiliary trigger circuits are in the predetermined condition. If the number of pulses is a multiple of N, during each pulse series interval the counter will reach the same position. It may be that in this position an auxiliary trigger circuit is switched over, but another auxiliary trigger circuit will never be switched over, so that the signal circuit will not be made operative. If the number of pulses is not a multiple of N, then the position reached by the counter during the pulse series intervals shifts through the counter, so that successively all auxiliary trigger circuits will be set, causing the signal to be made operative.

It is an advantage of the latter embodiment that it needs no cathode ray oscillograph. It may be true that the said oscillograph need not constitute a part of the complete system and that a separate cathode ray oscillograph may be connected to the remaining part of the arrangement, but nevertheless such a relatively expensive apparatus must be available for this purpose.

The second embodiment operates perfectly provided that the number of positions of the counter is a prime number. If this is not the case and if the number of positions of the counter and the number of pulses in a series to be observed have a factor in common then, as will be elucidated in the description of the various embodiments, the arrangement may fail to make the signal circuit operative. The complications arising therefrom can be avoided by dividing the counter into at least two groups of successive positions, each of which group controls an auxiliary trigger circuit allotted to it. The change of state of each counter in a group supplies a voltage differing from a quiescent value to an "or" circuit allotted to the group. The voltage passes through this "or" circuit to an "and" circuit allotted to the group. The "and" circuit is controlled by the circuit arrangement to pass said voltage during the pulse series intervals established by the circuit arrangement to a control input circuit of an auxiliary trigger circuit allotted to the group. The trigger circuit is thereby switched over to a predetermined one of its two possible conditions. A signal circuit is made operative by the output of a coincidence circuit as soon as all auxiliary trigger circuits are in the predetermined condition.

Any type of electronic counter with a cyclic character may be used in an arrangement according to the invention. Simple and effective embodiments are obtained however, if ring counters with trigger circuits are employed and the voltages supplied by the counter in certain positions are supplied by trigger circuits of the counter when they change state in response to a pulse in a series.

In certain cases the application of such a ring counter may require special measures. One such case is where two groups of positions are adjacent. Another such case is where one of the groups contains the trigger circuit in the counter which changes its state when the counter is reset to its initial position. These measures will be discussed when certain embodiments are described in detail.

In another group of embodiments the counter is sampled and reset to its zero position in a pulse series interval to ascertain whether the counter has reached the initial position again after counting a complete pulse series.

In a very effective embodiment of this type the counter is a ring counter with trigger circuits. During a pulse series interval the circuit arrangement sets a monostable trigger circuit, which in its set condition controls the examination of the position reached by the counter. The resetting of the counter is initiated when the monostable trigger returns to its reset condition.

In yet another embodiment of the same type the circuit arrangement for establishing the occurrence of a pulse series interval drives an auxiliary counter to its next position during each such interval. The counter in its successive positions, alternately controls the resetting of the counter, and the operation of an arrangement which establishes whether the counter has reached its initial position.

Preferred embodiments of the present invention will now be described in greater detail by way of example with reference to the accompanying drawings in which.

The FIGS. 5, 6 and 7 show diagrams of the representations which may be written on the screen of the cathode ray oscillograph of an arrangement according to FIG. 1 as well as of the moments of occurrence of certain voltages in other embodiments.

Figure 1:
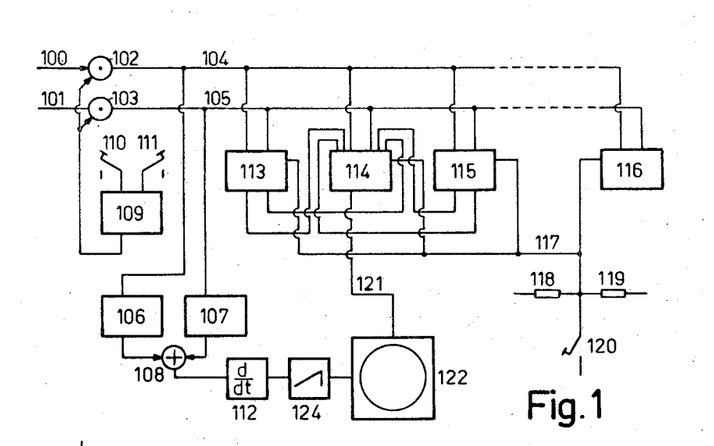
FIG. 1 shows a block diagram of an arrangement according to the invention which operates with a cathode ray oscillograph.

In the upper right hand side of FIG. 1 a ring counter with a number of trigger circuits is shown. Only four of these trigger circuits 113, 114, 115 and 116 are represented in the figure. The way in which these trigger circuits are represented symbolically will be explained with reference to FIG. 3. In this figure 301 is the trigger circuit itself. This trigger circuit can be in one of two stable conditions, the set condition and the reset condition. It is set by applying a positive voltage to the left hand input circuit 308 and then supplies a voltage which is high with respect to its quiescent value through its output circuit 310. The trigger circuit can be reset by applying a positive voltage to the input circuit 309 after which the trigger circuit supplies a voltage which is high with respect to the quiescent value through its output circuit 311 and the quiescent voltage through the output circuit 310. The control input circuit 308 is connected to the output circuit of the "or" circuit 306. One of the input circuits of "or" circuit 306 is an output circuit of the "and" circuit 302. Consequently a high potential can be supplied to the control input circuit 308 of the trigger circuit either by applying a high potential to the input circuit 304 or by simultaneously applying high potentials to the three input circuits of the "and" circuit 302. In a similar way the "and" circuit 303 and the "or" circuit 307 cooperate with the control input circuit 309. In the block diagrams of the embodiment only the counter rectangle 312 and such input and output circuits as are used in the part of the circuit described are shown.

The pulses $X_1$ of the series to be examined are received by way of the input circuit 100. The circuit 101 receives the pulse series $X_2$ which is the inversion of the pulse series first mentioned. In order to examine the uninverted pulse series these two pulse series are applied by way of the "and" circuits 102 and 103 to the conductors 104 and 105. A suitable control voltage is applied for this purpose to input circuits of the said "and" circuits by a bistable trigger circuit 109 when this trigger circuit is set. This trigger is set by pressing the contact button 110. In order to terminate the examination bistable rigger circuit is reset by pressing the button 111. This causes the "and" circuits 102 and 103 to stop any further pulses from reaching the counter. Ring counters are well known in the art and an extensive description thereof appears to be superfluous. The following remarks will, however, facilitate the understanding of the operation of the arrangement. During the examination the pulses $X_1$ of the series to be examined are applied through input circuit 100 to one of the three input circuits of the left hand "and" circuits of all trigger circuits in the ring counter. The conditions of the preceding and the following trigger circuit in the counter determined whether a certain trigger circuit will be set by a pulse $X_1$. It is necessary for the preceding trigger circuit to be set, and for this reason a second input circuit of the left hand "and" circuit of each trigger circuit in the counter is connected to the left hand output circuit of the preceding trigger circuit. Furthermore the following trigger circuit must be reset, and for this purpose the third input circuit of the left hand "and" circuit is connected to the right hand output circuit of the next trigger circuit in the counter. In a similar way the inverted pulses control the resetting of the trigger circuits in the counter. They are applied to one of the input circuits of the right hand "and" circuit of each trigger circuit in the counter, but, by means of the "and" circuit, the effect of these pulses is made to depend on whether the next trigger circuit is set and the preceding trigger circuit is reset. The electric connections for this purpose are only shown in the case of the trigger circuit 114; in order to simplify the drawings, the corresponding connections for the other trigger circuits are not shown.

If no special measures are taken, the trigger circuits may be in arbitrary conditions when an examination of a pulse series is to be started. For this reason it is necessary for the trigger circuit to be switched over to predetermined conditions before an examination starts. All trigger circuits but one are reset, while the remaining trigger circuit is set. In order to establish these conditions a conductor 117, which in the quiescent condition receives a predetermined potential from a voltage divider 118, 119, applies, as a result of the operation of a push button 120, a high potential to the free input, circuit of the right hand "or" circuit (the input circuit 305 in FIG. 3) of all trigger circuits which are to be reset and to the free input circuit of the left hand "or" circuit of the trigger circuit 116 which is to be set (input circuit 304 of the "or" circuit 306 in FIG. 3). This resetting operation of the counter is effected before the trigger circuit 109 is set and, consequently, before the examination starts. As soon as trigger circuit 109 is set, pulses supplied to the ring counter start to step the counter beginning from the initial position described above. It is not necessary for the first pulse which reaches the counter to be the first pulse in a pulse series. The examination may be started while a pulse series is in progress. During the first pulse series interval the counter will reach a position which is determined by arbitrary conditions. If, however, the number of pulses in a series is a multiple of the number of trigger circuits in the counter, the counter will return to the same position at the end of other pulse series. If the number of pulses in the series is not a multiple of the number of trigger circuits in the counter, then the trigger circuit which is set during the pulse series interval appears to be shifted through the counter.

The circuit arrangement for establishing the occurrence of a pulse series interval comprising, in the embodiment described, two monostable trigger circuits 106 and 107 and an "or" circuit 108. The trigger circuit 106 is set by the pulses of the series to be examined, while the trigger circuit 107 is set by the inverted pulses supplied by way of the conductor 105. After being set, such a monostable trigger circuit remains in the set condition during an adjustable interval, which is adapted to the pulse frequency in such a way that a trigger circuit, which is set by a pulse in a certain series returns, to its reset condition before the occurrence of the next pulse in the same series but after the beginning of the pulse of the other series located between the two pulses mentioned above. Consequently, as long as pulses and inverted pulses are received by the conductors 104 and 105, with the formal frequency and pulse interval, the trigger circuits 106 and 107 will be set during overlapping periods, and consequently either the left hand output circuit of the trigger circuit 106 or the left hand output circuit of the trigger circuit 107 or both output circuits will apply an increased voltage to the input circuits of the "or" circuit 108. Consequently, the output circuit of this "or" circuit will supply an increased output voltage as long as a pulse series is received. Shortly after the last inverted pulse of a series has been received, however, both trigger circuits 106 and 107 will have returned to their reset condition, causing the voltage supplied by the output circuit of the "or" circuit 108 to decrease suddenly. This rapid decrease of the voltage causes the differentiating circuit 102 to generate a short pulse. The direction of this pulse is such that it has no effect. When, however, a pulse series interval reaches its end and the first pulse $X_1$ of the next series reaches the conductor 104, the trigger circuit 106 is set again, so that the potential of the output circuit of the "or" circuit 108 suddenly increases. This sudden voltage increase is differentiated by the differentiating circuit thereby producing a pulse having a polarity capable of starting the time base circuit 124 of the cathode ray oscilloscope 122.

Figure 5:
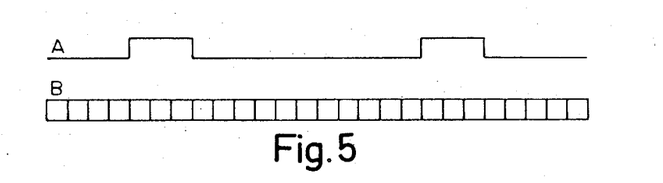

After being started, the time base circuit causes the ray of the oscillograph to move across the screen with a substantially constant speed. After each complete scan it returns to its quiescent condition, while the cathode ray is suppressed. The time base circuit 124 may be adjusted to provide a scanning cycle which is at most just as long as the interval between two successive pulse series intervals. Preferably, for reasons which will be elucidated below, the duration of the scanning cycle is substantially shorter. The voltage supplied by one of the output circuits of one of the trigger circuits of the counter, in this embodiment the left hand output circuit of the trigger circuit 114, controls the deflection of the cathode ray in a direction transverse to the time base movement. During a pulse series the counter effects a number of cycles. During each of these cycles the voltage which controls this deflection of the cathode ray when the said trigger circuit is set, has a value differing from its quiescent value. The set condition of the controlling trigger is displayed along the time base of the oscilloscope. The positions that these displays will obtain with respect to the point where the time base movement begins depend on the order of the pulse in the pulse series which is the first to reach the counter when the arrangement is made operative. It can be shown that if the number of pulses in the series is a multiple of the number of positions of the counter, that is of the number of the trigger circuits in the counter, the representations mentioned above will obtain fixed positions on the screen. Under these circumstances the same trigger circuit will be set during each pulse series interval. Moreover, each scan starts at the beginning of a pulse series, while the first deflection transverse to the scan occurs when the counter has taken a very definite number of steps after the pulse series interval. This number of steps corresponding to the number of counter stages between the trigger circuit in the counter, which is set during the pulse interval, and the trigger circuit in the counter which controls the deflection. These steps will take a well defined time interval. Consequently, the first representation has a fixed position with respect to the beginning of the scanning movement. The other representations follow after intervals which correspond to the duration of a complete cycle of the counter and consequently are also constant. Each representation is, therefore, located at a fixed distance from the previous one. Curve A in FIG. 5 shows such a series of representations for a counter with seven positions. If the number of pulses in a pulse series is not a multiple of the number of trigger circuits in the counter, then during the successive pulse series intervals different trigger circuits will be set. Consequently, the moments at which the trigger circuit 114 which controls the deflection transverse to the time base movement will be set, will continually shift with respect to the moment at which the time base movement starts. Instead of a number of fixed patterns separated by empty intervals, the screen now shows an apparently shifting rack shaped curve which resembles a number of overlapping toothed diagrams. Curve B in in FIG. 5 shows such a representation for a counter with seven trigger circuits. If such a representation is written on the screen, the number of pulses in a pulse series is not a multiple of the number of trigger circuits in the counter.

It may be that during the interval between two successive pulse series, a trigger circuit happens to be set that is located in the counter at a short distance before the trigger circuit 114 which controls the deflection. In this case the first representation will probably be incomplete or may even be absent, because the time base circuit needs a certain amount of time for starting its operation. This is, however, no disadvantage because the representations in the remaining part of the diagram may nevertheless be correctly interpreted. It would be possible to start the time base circuit by the leading edge of the pulse representing the pulse series interval and supplied by the trigger circuits 106 and 107 or by this pulse itself. Under these circumstances the first pulse supplied by the trigger circuit 114 would be represented on the screen in any case. This method can only be applied if the pulse series interval has a perfectly constant duration which is not too long. If the duration were not constant, the representations would move across the screen, and if the duration were too long, too small a part of the screen would be available for representing the pulses supplied by the trigger circuit 114, making it difficult to judge the character of this representation.

It is obvious that it is not necessary to represent the complete pulse series supplied by the trigger circuit 114 on the screen of the oscillograph. In the contrary, it is desirable to show only a part of this pulse series because then the separate pulses supplied by the trigger circuit 114 can be observed more accurately. A similar representation on the screen may be obtained by causing the voltage supplied by the trigger circuit 114 to suppress a cathode ray which would otherwise be free to pass. In this case, if the number of pulses in the series is a multiple of the number of the positions of the counter, the representation on the screen will be a line with short interruptions, while an uninterrupted line will be shown if the number of pulses in the series is not a multiple of the number of positions of the counter. Under these circumstances the interruptions will be shifted along the time base so that they will be covered by the lines written during other sweeps of the cathode ray. Obviously it is necessary for the cathode ray to be suppressed during the return sweep. The arrangement, moreover, may be built in such a way that the cathode ray is normally suppressed and is passed in response to a signal from the trigger circuit 114 which controls the cathode ray when this trigger circuit has been switched over by a pulse.

Furthermore the cathode ray may be controlled by a combination of trigger circuits in the counter. The output voltages of a number of trigger circuits in the counter for example, may control the cathode ray by way of an "or" circuit. These trigger circuits may be successive or non-successive trigger circuits in the counter.

It will be obvious that the counter need not be a ring counter of the type described. Control operation of the type described above can be effected by any type of electronic counter and the same is valid for the embodiments to be described below.

Figures 2, 3:
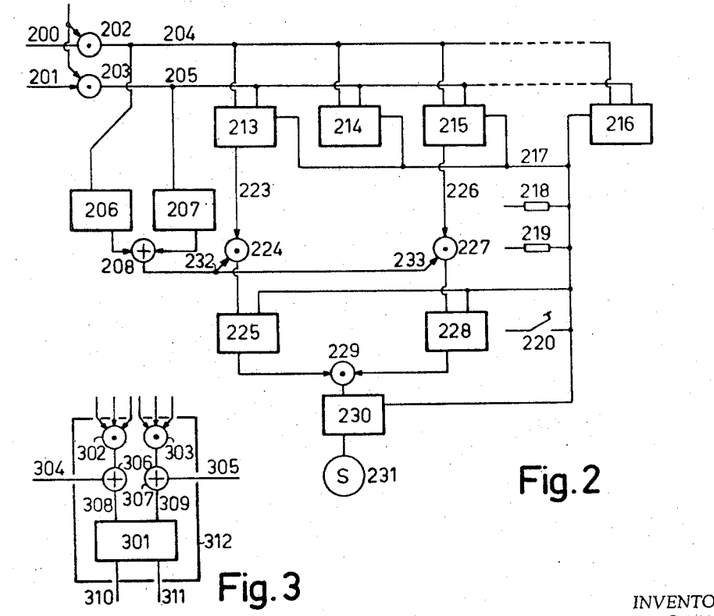
FIGS. 2 and 4 show arrangements according to the invention operating with trigger circuit ring counters that are not reset to zero between the successive pulse series.
FIG. 3 shows in greater detail the symbolic representation of a trigger circuit used in the drawings.

FIG. 2 shows a second embodiment of an arrangement according to the invention. In this embodiment no cathode ray oscilloscope is used. The figure shows a ring counter with the trigger circuits 213–216 (in which the mutual control circuits of the trigger circuits are not shown) and the conductors 204 and 205 by way of which the pulse series to be examined and the inverted pulse series are supplied to the counter when the "and" circuits 202 and 203 let these pulse series pass. The monostable trigger circuits 206 and 207 and the "or" circuit 208 constitute the circuit arrangement for establishing the occurrence of the interval between two successive pulse series. This part of the arrangement operates in a way similar to that in which the corresponding part of the arrangement according to FIG. 1 operates. The operation may be understood by reading the above description of this part of FIG. 1, provided that in the references in this description the first figure is replaced by the figure 2. When the arrangement according to FIG. 2 is reset to its quiescent condition by pressing the button 220 the three bistable trigger circuits 225, 228 and 230 are reset. Consequently, before the arrangement starts to operate all trigger circuits are reset except for the trigger circuit 216 in the counter.

In the operation of the arrangement according to FIG. 2 various cases may occur.

Assume that a number of pulses in each pulse series is a multiple of the number of trigger circuits in the ring counter. Then during the pulse series intervals the same trigger circuit in the counter will always be set. It may be that this is neither the trigger circuit 213 nor the trigger circuit 215. Then during each pulse series interval these trigger circuits will apply a low voltage to the input circuits 223 and 226 of the "and" circuits 224 and 227. Consequently, the high potential which the two trigger circuits 206 and 207 apply through the "or" circuit 208 during each pulse series interval to the input circuits 232 and 233 of the "and" circuits 224 and 227 will not reach the left hand control input circuits of the trigger circuits 225 and 228. Consequently, these trigger circuits will remain in their reset conditions and the two input circuits of the "and" circuits 229 will have a low potential. The left hand input circuit of the trigger circuit 230 will also receive a low potential, causing this trigger circuit to remain in its reset condition.

It may also be the case that the trigger circuit which is set during each pulse series interval happens to be one of the two trigger circuits 213 and 215. Assume that it is the trigger circuit 215. During each pulse series interval this trigger circuit then applies a high voltage to the input circuit 226 of the "and" circuit 227. The high voltage which the trigger circuits 206 and 207 apply during the pulse series interval to the input circuit 233 of this "and" circuit will thereby be able to reach the left hand input circuit of the trigger circuit 228, causing this trigger circuit to be set. The right hand input circuit of the "and" circuit 229 then obtains a high voltage. The trigger circuit 230 will nevertheless remain in its reset condition because the trigger circuit 225 remains in its reset condition and the low voltage at the other input circuit of the "and" circuit is consequently maintained.

Assume that the number of pulses in a pulse series is not a multiple of the number of trigger circuits in the ring counter. In this case different trigger circuits in the counter will be set during the successive pulse series intervals. Assume, for example, that the counter comprises seven trigger circuits and that the pulse series contains a number of pulses which is a multiple of seven increased by one. The trigger circuit which is set during a certain pulse series interval will then be located one position further in the counter than the trigger circuit which was set during the previous pulse series interval. As a rule, under these conditions, all trigger circuits in the counter will be set during a pulse series interval in turn. During a given pulse series interval, for instance, the trigger circuit 213 may be set, as a result of which, during the same interval, the trigger circuit 225 will also be set. A few pulse series intervals later the trigger circuit 215 will be set, as a result of which the trigger circuit 228 will also be set. The two input circuits of the "and" circuit 229 now receive a high potential which is thereby conducted to the left hand control input circuit of the trigger circuit 230, causing this trigger circuit to be set. The signal 231 (for instance a gas discharge tube) becomes operative, indicating that the number of pulses in the pulse series is not a multiple of the number of trigger circuits in the counter.

The above considerations are only valid insofar as the number of trigger circuits in the counter is a prime number. If this is not the case certain trigger circuits in the counter will never be set during a pulse series interval. Which of the trigger circuits will never be set is determined by the number of pulses in the pulse series and by the moment in a pulse series at which the first pulse happens to be supplied to the counter. These phenomena will be more readily understood by considering various concrete cases. Consider, for example, the case where the successive states of a counter with N trigger circuits driven by pulse series with a constant number of pulses. No signal appears to be given when the number of pulses in a series is a multiple of N. A signal may also fail to be given if the number of pulses in a series is not a multiple of the number of trigger circuits in the counter, but these numbers have a common factor. If the number of trigger circuits in the counter is 9, for instance, and the number of pulses in the series is 3+a multiple of 9, or 6+a multiple of 9, only those trigger circuits in the counter which are separated by two other trigger circuits will be set from time to time. Depending on the starting moment, these trigger circuits will be the trigger circuits 3, 6 and 9 or 2, 5 and 8, or 1, 4 and 7. In the embodiment shown in FIG. 2, in which the states of two trigger circuits which are separated by one position control the signal, the above mentioned conditions will never give rise to a signal even though the number of pulses in the series is not a multiple of the number of trigger circuits in the counter.

Figure 4:
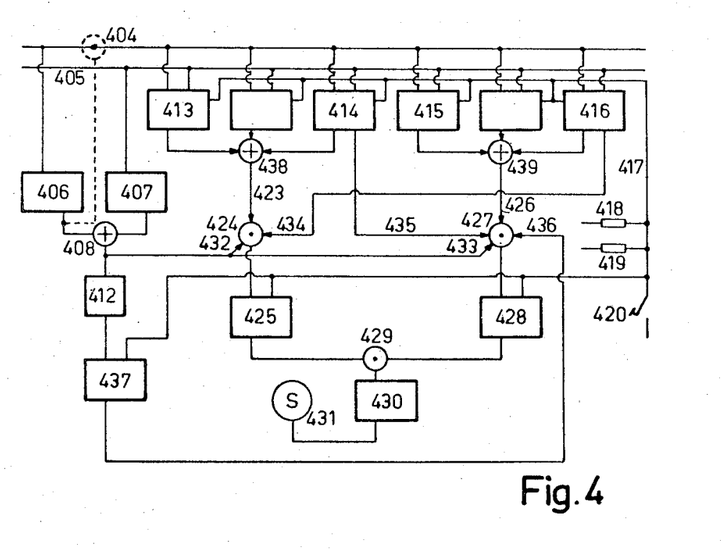

These difficulties may be overcome as follows. If the number of trigger circuits in the counter is not a prime number then the smallest factor $m$ of this number of trigger circuits, which is a prime number, is established. The trigger circuits in the counter are arranged in $m$ equal groups of successive trigger circuits. In a counter with 4 trigger circuits, there will be 2 groups of 2 trigger circuits; in a counter with 6 trigger circuits there will be 2 groups of 3 trigger circuits; in a counter with 8 trigger circuits 2 groups of 4 trigger circuits will be present, and in a counter with 9 trigger circuits 3 groups of 3, and in a counter with 12 circuits 2 groups of 6 trigger circuits. The circuit according to FIG. 2 is altered in such a way that the setting of each of the trigger circuits 225 and 228 is made dependent on the conditions of all trigger circuits of such a group by means of an "or" circuit. If in a pulse series interval only one of the trigger circuits in such a group is set, then the auxiliary trigger circuit 225 controlled by this group is also set. FIG. 4, which only shows those parts of the circuit which are essential for controlling the signal, shows the cooperation of such groups of trigger circuits in a counter having 6 trigger circuits with the corresponding auxiliary trigger circuits for controlling the signal. The trigger circuits in the counter are arranged in 2 groups of 3 trigger circuits, the group 413–414, and the group 415–416. If the number of pulses in a pulse series is a multiple of the number of trigger circuits in the counter, then in each pulse series interval a certain trigger circuit in a certain group is set. The auxiliary trigger circuit 425 or 428, allotted to this group, is also set. Because of the presence of the "and" circuit 429 no signal is given. If the number of pulses in a series is not a multiple of the number of trigger circuits in the counter, and these two numbers have no common factor, then all trigger circuits in the counter will be successively set during successive pulse series intervals. It is clear that the signal is then made operative. If the number of pulses in a series and the number of trigger circuits in the counter have a factor in common, then, as shown above, various trigger circuits in the counter will never be set during the pulse series intervals. An investigation into various concrete cases shows, however, that without exception the trigger circuit which is set during a pulse series interval will, during the examination of the same series, sometimes be located in one group and sometimes in the other group. Consequently, the two auxiliary trigger circuits 425 and 428 will be successively set, so that a signal will be given.

If the counter comprises a large number of trigger circuits and the number of groups is larger than two (for instance three for 9 trigger circuits or 5 for 25 trigger circuits) it may happen that when the number of pulses in the pulse series is a multiple of the number of trigger circuits in the counter, the trigger circuit which is set during the pulse series interval belongs to a group which does not cooperate with an auxiliary trigger circuit such as 425 or 428. In this case these auxiliary trigger circuits will remain in their reset conditions, so that no signal is given.

Special precautions must be taken if the auxiliary trigger circuits are controlled by two directly adjacent groups for under these circumstances an incorrect signal may be given. Assume that during a pulse series interval the last trigger circuit of the first one of two such adjacent groups was set, for instance the trigger circuit 414. The auxiliary trigger circuit allotted to this group would then be set. The first pulse following the pulse series interval would, under these circumstances, set the first trigger circuit of the second of the two adjacent groups. Simultaneously therewith one of the trigger circuits 406 and 407 belonging to the circuit arrangement for establishing the occurrence of a pulse series interval would be set. It is, however, not certain that the voltage which indicates the occurrence of a pulse series interval and which was supplied by way of the "or" circuit 408 will have already been removed by this trigger circuit before the trigger circuit to be set in the counter has reached its set condition. If the trigger circuit in the circuit arrangement for establishing the occurrence of a pulse series interval should be slightly slow in operation then it might be possible for the "and" circuit, such as 427, through which the second group controls its auxiliary trigger circuit 428, to receive high potentials through both its input circuits during a sufficiently long interval for setting the said auxiliary trigger circuit. During the previous pulse series interval the other auxiliary trigger circuit 225 was set, and consequently a signal will be incorrectly produced. In principle the initiation of such an incorrect signal can be prevented by suitably determining the speeds of operation of the various trigger circuits, but preferably a more positive method should be applied. In connection therewith in the embodiment of the type described with reference to FIG. 4, the "and" circuits 424 and 427 are provided with a third input circuit which causes the passage of the voltage which are to set the auxiliary trigger circuits to depend on whether the last trigger circuit in the first of the two adjacent groups has been reset. As a result thereof the passage to the input input circuit of the auxiliary trigger circuit belonging to the second group is blocked during an interval which is sufficiently long to permit the circuit arrangement for establishing the occurrence of a pulse series interval to take over this blocking until the next pulse series interval. If the counter only comprises two groups, then the first group is adjacent to the other. This precautionary measure must be taken cross-wise, as has been shown in FIG. 4 (input circuits 434 and 435 of the "and" circuits 424 and 427). If a group is only adjacent to one other group, then only one of the connections described above is required, and if there are more than three groups, then the groups which partake in the setting of the auxiliary trigger circuits can be arranged in such a way that they are not adjacent. It would also be possible to avoid the above complications by causing the supply to the counter of the pulses in the pulse series itself (but not the supply of the inverted pulses) to be dependent on the fact that the monostable trigger circuit 406 controlled by the pulses of the pulse series is set. A connection for this purpose is shown in FIG. 4 in dotted lines. This method has the disadvantage that the first pulse which reaches the counter may be slightly distorted, especially shortened. Finally, the circuit according to FIG. 4 requires special measures, because at the beginning of the operation of the circuit one of the trigger circuits in the counter must be set. Consequently, this trigger circuit might set one of the auxiliary trigger circuits before the first pulse series has been supplied to the arrangement, so that the monostable trigger circuits 406 and 407 in the circuit arrangement for establishing the occurrence of a pulse series interval would still be in their reset conditions. In connection therewith an "and" circuit, by way of which the trigger circuit which is set in the initial position of the counter may set an auxiliary trigger circuit such as 428, is blocked until the circuit arrangement for establishing the occurrence of a pulse series interval is or has been in the condition resulting from the reception of such a pulse series interval. In order to do this the circuit shown in FIG. 4 comprises the trigger circuit 437, which is reset when the complete arrangement is returned to its quiescent condition by pressing the button 420. In this reset condition it applies such a voltage to the input circuit 436 of the "and" circuit 427 that the voltage supplied in the quiescent state of the counter by the trigger circuit 416 which is set by pressing the button 420, will not be able to reach the input control circuit of the auxiliary trigger circuit 428 by way of the "or" circuit 439 and the "and" circuit 427. As soon as the arrangement becomes operative and the monostable trigger circuits 406 and 407 are set during overlapping intervals, the output circuit of the "and" circuit 408 supplies an increased voltage. This voltage is differentiated in the circuit 412, so that when this voltage comes into being a short pulse is applied to the left hand control input circuit of the bistable trigger circuit 437. This pulse, however, has not the correct sign for setting the trigger circuit 437. However, as soon as a pulse series interval occurs and the output voltage of the "or" circuit 408 regains its quiescent value the differentiating circuit 427 again supplies a small pulse which now has the opposite sign, and this pulse sets the trigger circuit 437, as a result of which the input circuit 436 obtains a potential which permits the auxiliary trigger circuit 428 to be set by the trigger circuits in the group 415–416. The trigger circuit 437 remains in its set condition during the remaining part of the examination of the pulse series. This circuit arrangement prevents the trigger circuit in the counter which is set in the quiescent state of the counter from initiating an incorrect signal. It will be readily understood that this special measure is only required because the control of the two auxiliary trigger circuits is not effected by separate trigger circuits of the counter but by groups of trigger circuits comprising a plurality of trigger circuits, while no trigger circuits are present which do not belong to such a group. If certain trigger cricuits in the counter do not belong to such a group, for instance if there are 9 trigger circuits in the counter and two groups of three trigger circuits controlling the auxiliary trigger circuit, then it is always possible to locate that trigger circuit in the counter which is set in the quiescent state of the counter in one of the groups which does not affect the control of an auxiliary trigger circuit. In this case this trigger circuit will never be able to set an auxiliary trigger circuit while the arrangement is in its quiescent condition.

Figure 8:
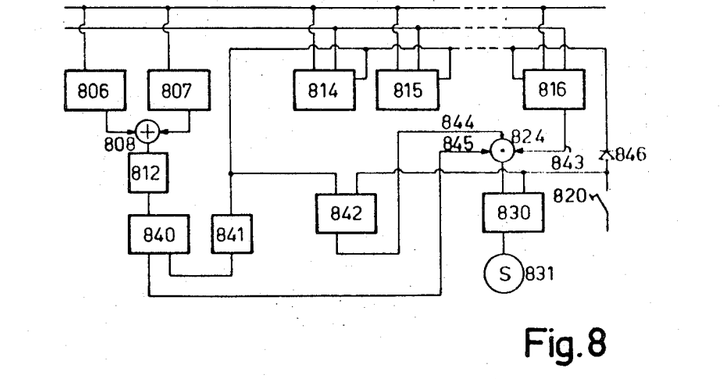
FIG. 8 shows an example of an arrangement according to the invention with a ring counter that is reset between successive pulse series.

It is also possible to build an arrangement according to the invention in which the counter is reset during each pulse series interval. If the number of pulses in a pulse series is actually a multiple of the number of trigger circuits in the counter, then, in the pulse series interval which follows after such a series, the counter will have returned to its quiescent state, and it suffices to examine whether the trigger circuit which ought to be set in this quiescent state actually is set. This trigger circuit can then be arranged so as to control, when it is in its reset condition, the switching-in of a signal by way of an "and" circuit which the circuit arrangement for establishing a pulse series interval causes to be only conductive during such intervals. Certain precautionary measures must be taken, however. It is not desirable for the resetting of the counter to be controlled by the voltage change produced by the circuit arrangement for establishing the occurrence of a pulse series interval at the end of such an interval because the counter would then be subjected to two antagonistic influences. It would receive simultaneously the reset pulse and the first pulse of the series to be examined. This might lead to the loss of a pulse. It is also undesirable for the counter to be reset at the beginning of a pulse series interval, because the examination of the position reached by the counter has to be effected during this interval. In the least complicated arrangement for this purpose the pulse series interval is divided into two parts, a first part, during which the position reached by the counter is established, and a second part, during which the counter is reset to its initial position. A circuit arrangement suitable for this purpose is represented in FIG. 8, in which mainly only those parts are shown that are important in connection with this method of operation. It shows the circuit arrangement for establishing the occurrence of a pulse series interval consisting of the monostable trigger circuits 806, 807 and the "or" circuit 808, as well as the trigger circuits 814, 815 and 816 belonging to the counter. Before an examination is started the arrangement is returned to its quiescent condition by pressing the button 820. This causes the auxiliary trigger circuit 830 to be reset, and the trigger circuits in the counter to be switched over to the required conditions, which, in the case of the trigger circuit 816 is the set condition. Then, in the way described above, pulse series are supplied to the arrangement, causing the counter to step, while moreover, the two monostable trigger circuits 806 and 807 are set, so that the "or" circuit 808 described above produces a negative voltage. This voltage is applied to a differentiating circuit 812, which generates a short pulse when this negative voltage comes into being. Because of its sign, this pulse has no effect. At the end of the pulse series the voltage supplied by way of the "or" circuit 808 resumes its quiescent value so that the differentiating circuit 812 will again supply a short pulse. This pulse has such a sign, that it sets the trigger circuit 840, as a result of which this trigger circuit temporarily applies a voltage to the conductor 845, which permits the "and" circuit 824 to pass on the high voltage that the trigger circuit 816 would supply if it were in its reset condition as a result of the fact that the number of pulses in a series is not a multiple of the number of trigger circuits in the counter. Were the trigger circuit 816 actually reset, then this voltage would set the auxiliary trigger circuit 830, causing the signal 831 to become operative. If, however, the number of pulses in the series is a multiple of the number of trigger circuits in the counter, then the trigger circuit 816 is set during the pulse series interval, so that the right hand input circuit of the "and" circuit 824 does not receive a high voltage from the trigger circuit 816, and in this case the auxiliary trigger circuit 830 remains in its reset condition. The examination described above should not be effected during the first pulse series interval, because probably the first series will be incomplete, so that an examination during the first pulse series interval will generally lead to an incorrect result. The trigger circuit 842 which was reset by pressing the button 820, prevents such an examination before the second pulse series interval, and for this purpose it applies a low voltage to the input circuit 844 of the "and" circuit 824, so that the high voltage which might be applied to the "and" circuit 824 by the trigger circuit 816 in its reset condition is prevented from reaching the auxiliary trigger circuit 830. After an interval that is shorter than the pulse series interval, the monostable trigger circuit 840 returns to its reset condition. It then causes the potential of the input circuit 845 of the "and" circuit 824 to obtain a low value, so that the auxiliary trigger circuit 830 can no longer react to the state of the trigger circuit 816 in the counter, even if the voltage applied to the upper input circuit 844 of the "and" circuit 824 does not prevent it.

Moreover, the voltage supplied by the right hand output circuit of the monostable trigger circuit 840 to the differentiating circuit 841, will suddenly decrease so that this differentiating circuit produces a positive pulse. During the first pulse series interval this positive pulse sets the auxiliary trigger circuit 842, so that, for the remaining part of the examination of the pulse series, the voltage applied to the upper input circuit 844 of the "and" circuit 824 remains high and the monostable trigger circuit, during the first part of the pulse series intervals, will be able to make the "and" circuit 824 conductive for the voltages which may be supplied by the trigger circuit 816 in the counter. Furthermore, all trigger circuits in the counter are returned to their quiescent states by the pulse produced by the differentiating circuit 841. A diode 846 prevents the trigger circuits 830 and 842 from being reset. Consequently during each following pulse series interval the condition of the trigger circuit 816 in the counter is established. If this trigger circuit is set, which will be the case if the number of pulses in the pulse series is a multiple of the number of trigger circuits in the counter, nothing happens. If because the number of pulses in a pulse series is not a multiple of the number of trigger circuits in the counter, this trigger circuit is in the reset condition during such a pulse series interval, then the voltage produced by the trigger circuit 816 can set the auxiliary trigger circuit 830 for the purpose of making the signal circuit operative during the interval in which the monostable trigger circuit 840 is temporary in the set condition. The above arrangement has one small disadvantage. It may be necessary to adapt the adjustment of the monostable trigger circuit to the duration of the pulse series interval. In another embodiment of a similar arrangement according to the invention the circuit arrangement for establishing the occurrence of a pulse series interval causes an auxiliary counter to make one step at the beginning of each pulse series interval, and in its successive "positions" this counter, which may be a counter with two "positions," controls alternately the examination of the condition of the main counter and the resetting of the main counter.

In the above description it is assumed that the pulse series and its inverted pulse series are always available. In electronic data handling systems this will be generally the case, but if the inverted series is not available it is a very simple matter to generate it. It is possible to generate this inverted series by means of a standard inverter, but it may then happen that the pulses of the two series overlap slightly. It is, therefore, more effective to use the arrangement now described. In this arrangement each pulse of the series sets a monostable trigger circuit, which remains in its set condition for a period which is slightly longer than corresponds to the duration of a pulse, and which when it returns to its reset state, sets a second monosttable trigger circuit by way of a differentiating circuit. The second monostable trigger circuit supplies an inverted pulse as long as it is in its set condition.

Figure 6:
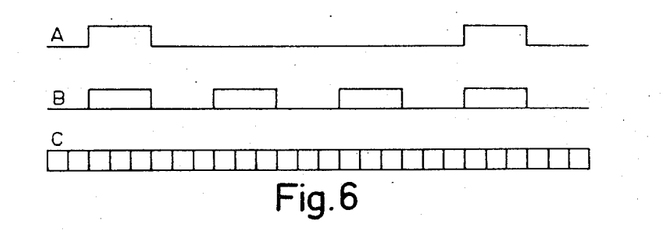

In the above description it has been shown, that the correct operation of certain arrangements according to the invention will be hampered if the number of trigger circuits in the counter is not a prime number and has a factor in common with the number of pulses in the pulse series. In FIG. 6 curve A shows the diagram written on the screen of the cathode ray oscillograph by a counter with 9 positions driven by a pulse series the number of pulses of which is a multiple of 9. Curve B shows the diagram written on the screen if the number of pulses in the pulse series is 3+a multiple of 9 or 6+a multiple of 9. In this case three diagrams of the type shown in part A of the figure are superposed in relatively displaced positions. The fact that such a superposition has taken place may be derived from the presence of a time base line under the representations of the pulses. In the curve A, in which no superposition has taken place, the time base line is absent in those parts which represent the pulses. In curve B the time base line of two other curves is visible below each pulse. FIG. 6, C shows the representation written on the screen if the number of pulses is not a multiple of 9 and not a multiple of 3.

Figure 7:
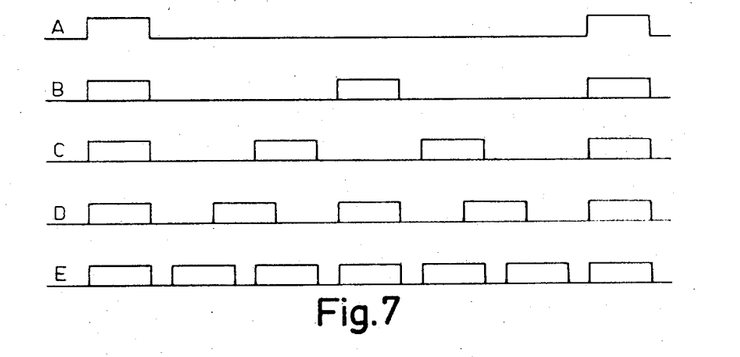

FIG. 7 shows a corresponding set of curves which applies to a counter with 12 trigger circuits. The curve A applies to a pulse series in which the number of pulses is a multiple of 12, the curve B is written if the number of pulses is 6+a multiple of 12, the curve C if the number of pulses is 8+a multiple of 12, the curve D if the number of pulses is a multiple of 12 plus a multiple of 3, whilst the curve E is written if the number of pulses in the series is a multiple of 12+a multiple of 2. These curves also show that if the number of pulses in a series is not a multiple of the number of trigger circuits in the counter, the time base line will be present below the representations of the pulses.

It is to be noted that in all cases described above in which an "and" circuit is controlled by various voltages in order to establish the condition of a trigger circuit in the counter at certain moments, this "and" circuit can always be replaced by a combination of "and" circuits. In FIG. 4, for instance, the blocking of the signal for as long as the last trigger circuit in a previous group has not been reset, can also be effected by a separate "and" circuit in the output circuit of the first trigger circuit in the following group. In this case a special "and" circuit controlled by the output voltage of the trigger circuit 414 must be present between the left hand output circuit of the trigger circuit 415 and the "or" circuit 439, in order that the trigger circuit 415 will only be able to supply a high output voltage to the "or" circuit 439 when the right hand output circuit of the trigger circuit 414 has a high potential owing to the fact that this trigger circuit has been reset. The "and" circuit 824 in FIG. 8 could be replaced by two "and" circuits in a similar way.

Insofar as in the arrangement described above counters with trigger circuits have been applied, it has been assumed that these counters were ring counters. Other types of counters such as "gray counters" or "feed back counters" can also be applied, however, and their adaptation to the present arrangement presents no serious complications. A ring counter, however, has the advantage that it may be easily adapted to a change in the number $n$ of which the number of pulses in the series is to be a multiple. This will be elucidated with reference to FIG. 1. As may be derived from this figure each trigger circuit in the counter is connected by way of 4 conductors to the previous trigger circuit and by means of 4 other conductors to the following trigger circuit in the counter. Be it asumed that the number of trigger circuits in the counter is adapted to the highest value of $n$ for which the arrangement can be used. By changing the said four connections it is then possible to reduce the number of trigger circuits in the counter, thus adapting the counter to a lower value of $n$. In this process of adaptation the trigger circuit 116, which is set when the counter is reset to its quiesecent state, and the trigger circuit 113, which controls the cathode ray, must remain in the counter. For this reason preferably adjacent trigger circuits in the counter are allotted to these tasks. The changes in the circuit are to be effected in the connections between other trigger circuits. For this purpose the connections between a trigger circuit A in the counter and the previous trigger circuit are interrupted, whilst, moreover, the connections between another trigger circuit B, which in the cycle of the counter is set by the pulses of the series before the trigger circuit A is set, and the following trigger circuit is also interrupted. Furthermore, a connection is established between the corresponding terminals of the trigger circuits A and B. The trigger circuits between these trigger circuits A and B are then removed from the counter. It would be possible to effect these circuit changes by means of multiple switches. In an arrangement according to FIG. 2 similar changes can be effected in a corresponding way, provided that the trigger circuits 213 and 215, which control the auxiliary trigger circuits 225 and 228, as well as the trigger circuit 216 which is set in the quiescent condition of the counter, remain in the counter. In an arrangement according to FIG. 8 only the trigger circuit 816 which is set in the quiescent state of the counter, must remain in the counter. In arrangements according to FIG. 4 complicated adaptations are unavoidable, because not only the length of the counter, but also the distribution of the groups as well as the connections of the output circuit of the trigger circuits in these groups with the auxiliary trigger circuits must be adapted.

What I claim is:

1. Apparatus for determining whether the number of pulses in a recurring pulse group is a multiple of N, which comprises detecting means for providing an output in response to the termination of each said group of pulses, an N stage counter for counting each pulse of said recurring pulse group, said counter adapted to repeatedly count up to N pulses, means connected to a stage of said counter and responsive to the output of said detecting means for reading out said connected stage of said counter during the termination of each said pulse group, and means coupled to said read out means for indicating any chaneg in succeeding counter read outs, the absence of such change thereby indicating that the number of pulses in said group is a multiple of N.

2. Apparatus as claimed in claim 1 wherein said read out means and said change indicating means comprises an oscilloscope having an input terminal connected to the output of said detecting means and a further input terminal connected to a stage of said counter, the face of said oscilloscope providing a scan in response to the output of said detecting means, said oscilloscope also providing a mark on said scan in response to the change of state of said counter stage, the absence of apparant movement of said mark on said oscilloscope thereby indicating that the number of pulses in said group is a multiple of N.

3. Apparatus for determining whether the number of pulses in a recurring group of pulses is a multiple of N which comprises detecting means for providing an output in response to the termination of each said group of pulses, an N stage counter for counting each pulse of said recurring pulse group, said counter adapted to repeatedly count up to N pulses, first coincidence gate means connected to said detecting means and to a stage of said N stage counter for providing an output in response to the concurrence of said output from said detecting means and the change of state of said connected stage of said counter, second coincidence gate means connected to said detecting means and to a higher significant stage of said counter separated from said lower significant stage by an additional stage for providing an output in response to the concurrence of an output from said detecting means and a change of state of said higher significant stage of said N stage counter, a first bistable element connected to the output of said first coincidence gate means and triggerable from a first to a second stable state in response to an output from said first coincidence gate means, a second bistable element connected to said second coincidence gate means and triggerable from a first to a second stable state in response to an output from said second coincidence means, and third coincidence gate means connected to said first and said second bistable elements for providing an output in response to the concurrence of the second stable state of both said first and said second bistable elements, the absence of an output from said third coincidence gate indicating that the number of pulses in said group is a multiple of N.

4. Apparatus for determining whether the number of pulses in a recurring group of pulses is a multiple of N which comprises detecting means for providing an output in response to the termination of each said group of pulses, an N stage counter for counting each pulse of said recurring pulse group, said counter divided into sets of successive stages and adapted to repeatedly count up to N pulses, means for sequentially triggering said counter stages from a first to a second stable state in response to said pulses of said pulse group, means for resetting said triggered counter stage in response to a pulse of said pulse group succeeding said triggering pulse, a separate coincidence gate connected to each said set of counter stages and connected also to the output of said detection means for providing an output in response to the concurrence of the second stable state of one of the stages in said corresponding set of counter stages and the output of said detection means, an auxiliary bistable element connected to the output of each said coincidence gate and switchable from a first to a second stable state in response to the output of the corresponding connected coincidence gate, and an auxiliary coincidence gate connected to all said auxiliary bistable elements, said further coincidence gate providing an output in response to the concurrence of the second stable states of all said auxiliary bistable elements, the absence of an output from said further coincidence gate indicating that the number of pulses in said pulse group is a multiple of N.

5. Apparatus as claimed in claim 4 wherein said counter contains at least two adjacent sets of stages, further including means responsive to the second stable state of the last triggerable stage of each set of counter stages for preventing the auxiliary bistable element corresponding to an adjacent group of stages from switching to the second stable state.

6. Apparatus for determining whether the number of pulses in a recurring group pulse is a multiple of N, which comprises detecting means for providing an output in response to the termination of each said group of pulses, an N stage counter for counting each pulse of said recurring pulse group, said counter adapted to repeatedly count up to N pulses, means for setting said counter stages to a predetermined state in response to said output from said detecting means, an auxiliary bistable element switchable from a first to a second stable state in response to the output of said detecting means, means intermediate said detecting means and said auxiliary bistable element for delaying the switching of said auxiliary bistable element until the termination of the output of said detecting means, a coincidence gate connected to said detecting means and to the output of said auxiliary bistable element for providing an output in response to the concurrence of the output from said detecting means and the second stable state of said auxiliary bistable element, said coincidence gate thereby providing an output at the termination of the second and further pulse groups, and read out means connected to the output of said coincidence gate for comparing the state of stages in said N stage counter to said predetermined state in response to the output of said coincidence gate, the correspondence of said counter read out with said predetermined counter state thereby indicating that the number of pulses in said pulse group is a multiple of N.

References Cited

UNITED STATES PATENTS 2,490,500  12/1949  Young _______________ 235—92
2,539,673  1/1951   Peterson ____________ 235—92

MAYNARD R. WILBUR, *Primary Examiner.*

G. J. MAIER, *Assistant Examiner.*